(12) United States Patent
Ye et al.

(10) Patent No.: US 7,233,918 B1
(45) Date of Patent: Jun. 19, 2007

(54) RATING BILLING EVENTS IN REAL TIME ACCORDING TO ACCOUNT USAGE INFORMATION

(75) Inventors: Sha Ye, San Jose, CA (US); David S. Labuda, Half Moon Bay, CA (US)

(73) Assignee: Oracle International Corporation, Redwood Shores, CA (US)

(*) Notice: Subject to any disclaimer, the term of this patent is extended or adjusted under 35 U.S.C. 154(b) by 720 days.

(21) Appl. No.: 09/617,590

(22) Filed: Jul. 18, 2000

(51) Int. Cl.
*G07B 17/00* (2006.01)

(52) U.S. Cl. .................. 705/30; 705/34; 705/39; 705/40

(58) Field of Classification Search .......... 705/30, 705/34, 40, 39
See application file for complete search history.

(56) References Cited

U.S. PATENT DOCUMENTS

| | | | |
|---|---|---|---|
| 4,849,884 A | 7/1989 | Axelrod et al. | 364/406 |
| 5,224,034 A | 6/1993 | Katz et al. | 364/401 |
| 5,450,477 A | 9/1995 | Amarant et al. | 379/93 |
| 5,615,109 A * | 3/1997 | Eder | 705/8 |
| 5,737,414 A * | 4/1998 | Walker et al. | 705/40 |
| 5,799,072 A * | 8/1998 | Vulcan et al. | 379/114.02 |
| 5,870,724 A | 2/1999 | Lawlor et al. | 705/42 |
| 5,960,416 A * | 9/1999 | Block | 705/34 |
| 6,058,173 A | 5/2000 | Penfield et al. | 379/144 |
| 6,078,897 A | 6/2000 | Rubin et al. | 705/14 |
| 6,112,190 A | 8/2000 | Fletcher et al. | 705/38 |
| 6,377,938 B1 * | 4/2002 | Block et al. | 705/32 |
| 6,401,098 B1 * | 6/2002 | Moulin | 707/102 |
| 6,564,047 B1 * | 5/2003 | Steele et al. | 455/405 |
| 2001/0034704 A1 * | 10/2001 | Farhat et al. | 705/39 |
| 2001/0056362 A1 * | 12/2001 | Hanagan et al. | 705/7 |
| 2002/0082881 A1 * | 6/2002 | Price et al. | 705/7 |

FOREIGN PATENT DOCUMENTS

GB   0063402 A1 *  7/1982

OTHER PUBLICATIONS

Syerson, Nancy, "Inside Graybar, a Profile of the Nation's Top Electrical Distributor", Industrial Maintance and Plant Operation, vol. 61, No. 11, p. 14, Nov. 2000.*
Davis, Charles, Online financing to boost procurement, Electronic Payment International, p. 14, Feb. 2000.*

* cited by examiner

*Primary Examiner*—F. Ryan Zeender
*Assistant Examiner*—Christopher Buchanan
(74) *Attorney, Agent, or Firm*—Townsend and Townsend and Crew LLP

(57) ABSTRACT

A method and system are provided for applying a volume discount scheme and rating transactions accordingly on a continuous basis, in a continuous processing system. At the time of a transaction or potential transaction, a cost including applicable volume discount is provided to a customer with reference to his current accumulated usage. When a customer is shopping on-line or placing a phone order, he can learn what discount he will obtain if he spends an incremental amount. A person using a service can inquire what the discounted cost or applicable rate is for a contemplated transaction.

32 Claims, 11 Drawing Sheets

SAMPLE RATING CURVE, PREFERRED CUSTOMER, PEAK RATES

| TIER | STEP POINT (NUMBER OF GAMES) | DISCOUNT PERCENTAGE | COST OF GAME IN DOLLARS |
|---|---|---|---|
| 1 | 5 | 0 | 10 |
| 2 | 10 | 10 | 9 |
| 3 | 20 | 25 | 7.5 |
| 4 | ∞ | 30 | 7 |

FIG. 6

RATING BILLING EVENTS IN REAL TIME ACCORDING TO ACCOUNT USAGE INFORMATION

The present invention relates to rating billing events, and more specifically to rating billing events in real time according to account usage information.

A volume discount is a discount given when a consumer purchases a large amount of whatever is being sold. For example, a volume discount can be a flat-tiered scheme, with discount rate step-ups at different usage points ("step points") and a flat rate on each tier. An example is rating phone calls at 10 cents per minute for the first 100 minutes of phone calls in a month, 5 cents per minute for the next 100 minutes that month, and 3 cents per minute for the rest of the month. A volume discount is an example of a usage dependent rating scheme.

In batch processing systems, an event is stored. An aggregation of events (batch) is periodically partially or fully processed. For example, partial processing might include a batch being sent to a central facility nightly. Periodically (typically at a month-end bill creation time) transactions are fully processed and rated (when there is a volume discount), a financial balance is calculated, and a user account statement (bill) created. For instance, phone bills are commonly created at the end of a month, total usage of various types of services calculated, rating applied, and amount owed calculated. Phone calls are not rated at the time of the event. For the discount scheme described above, for 157 minutes of usage, 100 minutes are charged at 10 cents/minute ($10.00) and 57 minutes at 5 cents/minute ($2.85). The bill amount is $12.85, assuming a zero starting balance.

A drawback of a batch system is the delays between batches mean the accounting system can include stale data. To rate an event in real time using a volume discount, the account's up-to-date cumulative usage of a resource is needed. The inability to know this number with certainty precludes rating an event at the time of the event.

When the interval between complete or nearly complete processing of batches is short, for example an hour or 10 minutes, sometimes the term "near-real-time" is used to describe the system. In such systems, transactions may be rated at intermediate points prior to creation of a month-end bill, and account information such as financial balance updated. The calculation may be done in a similar way as described for a month-end calculation in the preceding paragraph. As when the interval between batches is large, the delay between batches means that some of the data in the accounting system is guaranteed to be stale whenever a billing transaction occurs between times when batches are processed.

Volume discounting is a powerful marketing tool. Information about a discount makes a potential purchase more attractive to potential customers. Making available information about actual cost provides a useful service to customers, which can increase customer loyalty. Accordingly, it would be advantageous to be able to provide volume discounting information in real time, i.e. when the billing event is received.

SUMMARY OF THE INVENTION

A method and system are provided for applying a volume discount scheme and rating transactions accordingly on a continuous basis, in a continuous processing system. At the time of a transaction or potential transaction, a cost including applicable volume discount is provided to a customer with reference to his current accumulated usage. When a customer is shopping on-line or placing a phone order, he can learn what discount he will obtain if he spends an incremental amount. A person using a service can inquire what the discounted cost or applicable rate is for a contemplated transaction. Some specific embodiments of the invention are described below.

In one embodiment, the invention provides a computer implemented method for rating a billing event in a real time accounting system. A billing event for an account is received. Current usage information for the account is retrieved. The billing event is rated upon receiving the event, according to the billing event, the current usage information, and a usage dependent rating scheme.

In another embodiment, the invention provides a system for rating a billing event in a real time processing system. The system includes a processor and a computer readable medium coupled to the processor. The medium stores a computer program that includes code that receives a billing event for an account, code that retrieves current usage information for the account, and code that rates the billing event upon receiving the event, according to the billing event, the current usage information, and a usage dependent rating scheme.

In another embodiment, the invention provides a method for providing continuous volume discounting information in a computer implemented accounting system. An account is selected. A look-forward into a rating scheme is performed, responsive to account information comprising current accumulated usage information. Marketing information is sent to a user associated with the account responsive to performing the look-forward.

Other features and advantages of the invention will become readily apparent upon review of the following description in association with the accompanying drawings, where the same or similar structures are designated with the same reference numerals.

BRIEF DESCRIPTION OF THE DRAWINGS

FIG. 6 illustrates a sample rating curve.

DETAILED DESCRIPTION OF SPECIFIC EMBODIMENTS

Embodiments of the invention are described below with reference to flat-tiered volume discount rating schemes in specific processing systems and methods. However, embodiments of the invention are not limited to flat-tiered rating schemes, and embodiments of the invention can be implemented in various ways. For example, aspects of the invention can be implemented in software or hardware or using special purpose processors or by any other known mechanism. Therefore, the description of the embodiments that follows is for purposes of illustration and not limitation.

Embodiments of the invention can be used in conjunction with inventions described in pending applications: "Distributed Nonstop Architecture for an Event Processing System", filed on May 2, 2000, inventors Ravi Shankar et al., application Ser. No. 09/562,785, which is hereby incorporated by reference, and "Method and Apparatus for Providing a Clean Accounting Close for Real Time Billing System", filed on May 14, 1997, inventors Gary L. Owens et al., application Ser. No. 08/856,372, which is hereby incorporated by reference.

Figure 1:
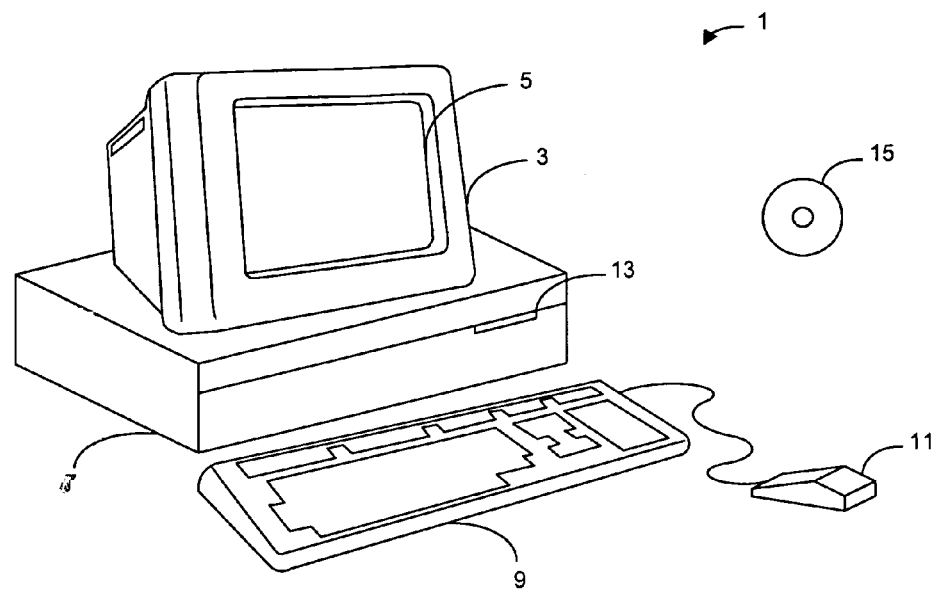
FIG. 1 illustrates an example of a computer system that can be utilized to execute the software of an embodiment of the invention.

FIG. 1 illustrates an example of a computer system that can be used to execute software implementing a portion of a method of an embodiment of the invention, and can act as an entry-point/interface for an end-user, as an intermediary between an end-user and an accounting system, or as a central processing facility/primary data center for the accounting system. FIG. 1 shows a computer system 1 that includes a display 3, screen 5, cabinet 7, keyboard 9, and mouse 11. Mouse 11 can have one or more buttons for interacting with a graphical user interface. Cabinet 7 houses a CD-ROM drive 13, system memory and a hard drive (see FIG. 2) which can be utilized to store and retrieve software programs incorporating computer code that implements the invention, data for use with the invention, and the like. Although CD-ROM 15 is shown as an exemplary computer readable storage medium, other computer readable storage media including floppy disk, tape, flash memory, system memory, and hard drive can be utilized. Additionally, a data signal embodied in a carrier wave (e.g., in a network including the Internet) can be the computer readable storage medium.

Figure 2:
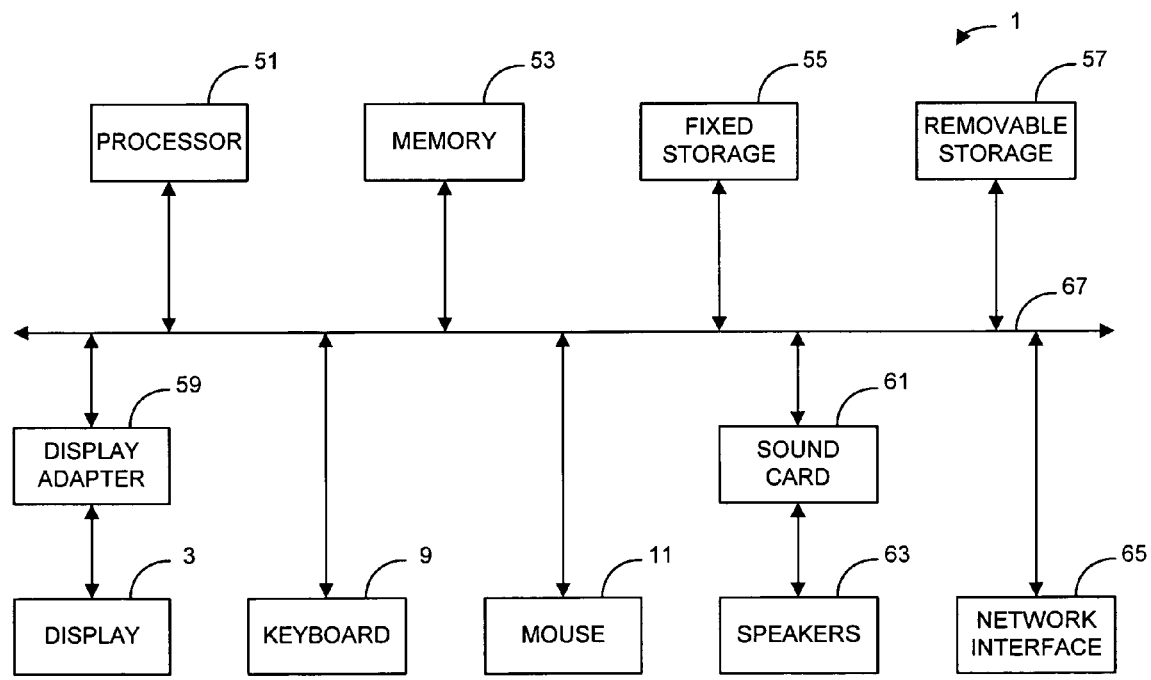
FIG. 2 illustrates a system block diagram of the computer system of FIG. 1.

FIG. 2 shows a system block diagram of computer system 1 that can be used to execute software implementing a portion of a method of an embodiment of the invention. As in FIG. 1, computer system 1 includes monitor 3 and keyboard 9, and mouse 11. Computer system 1 further includes subsystems such as a central processor 51, system memory 53, fixed storage 55 (e.g., hard drive), removable storage 57 (e.g., CD-ROM drive), display adapter 59, sound card 61, speakers 63, and network interface 65. Other computer systems suitable for use with the invention can include additional or fewer subsystems. For example, another computer system could include more than one processor 51 (i.e., a multi-processor system) or a cache memory.

The system bus architecture of computer system 1 is represented by arrows 67. However, these arrows are illustrative of any interconnection scheme serving to link the subsystems. For example, a local bus could be utilized to connect the central processor to the system memory and display adapter. Computer system 1 shown in FIG. 2 is but an example of a computer system suitable for use with the invention. Other computer architectures having different configurations of subsystems can also be utilized.

Figure 3:
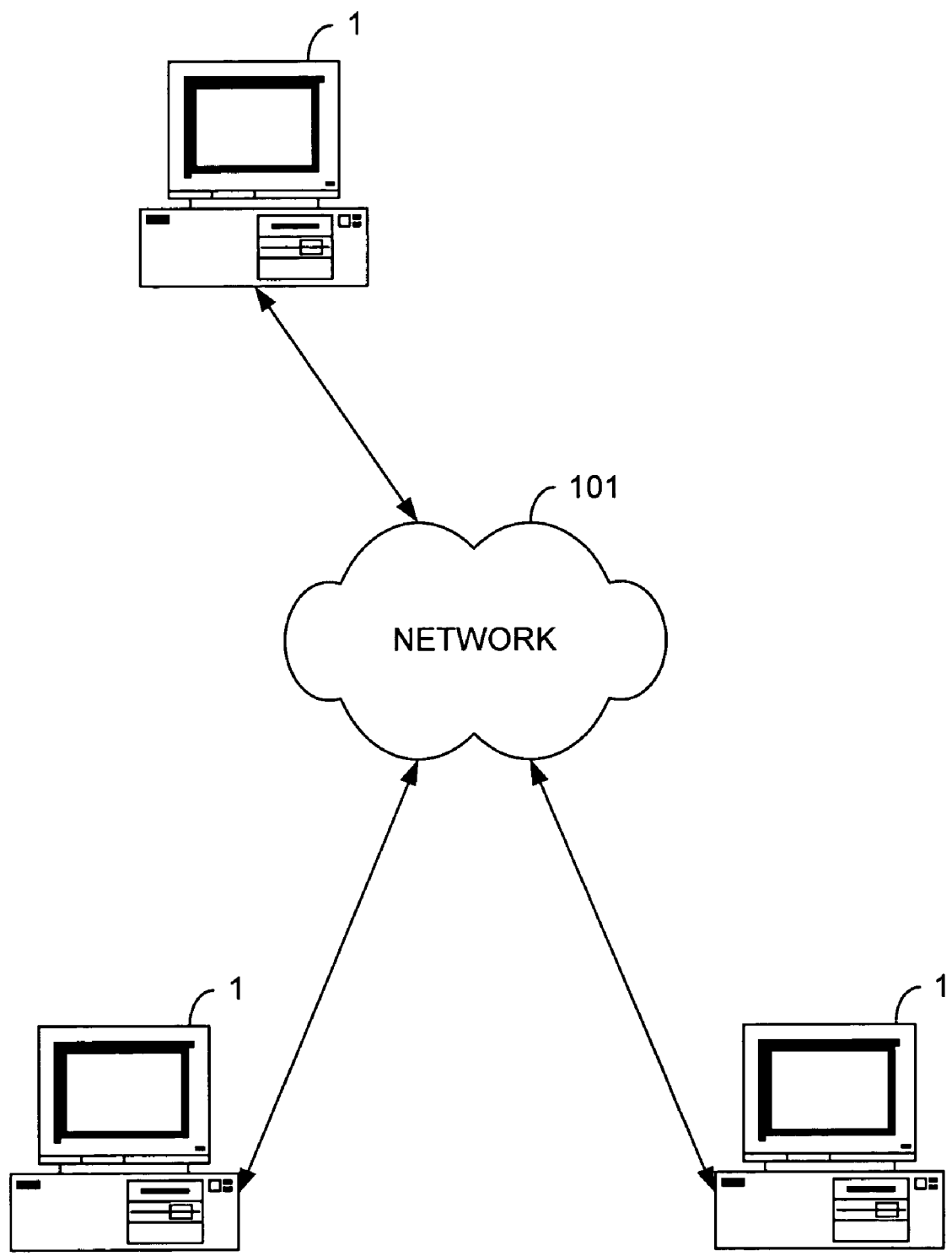
FIG. 3 illustrates a network of multiple computer systems such as the Internet.

FIG. 3 shows a schematic drawing of a network of multiple computer systems. A network 101 provides communication between multiple computer systems 1. In an embodiment of the invention, such multiple computer systems 1 can act as an entry-point/interface for an end-user (e.g. a computer executing a client application), as a transaction collection point, as an intermediary between an end-user and the accounting system, or as a central processing facility/primary data center for the accounting system.

Figure 4:
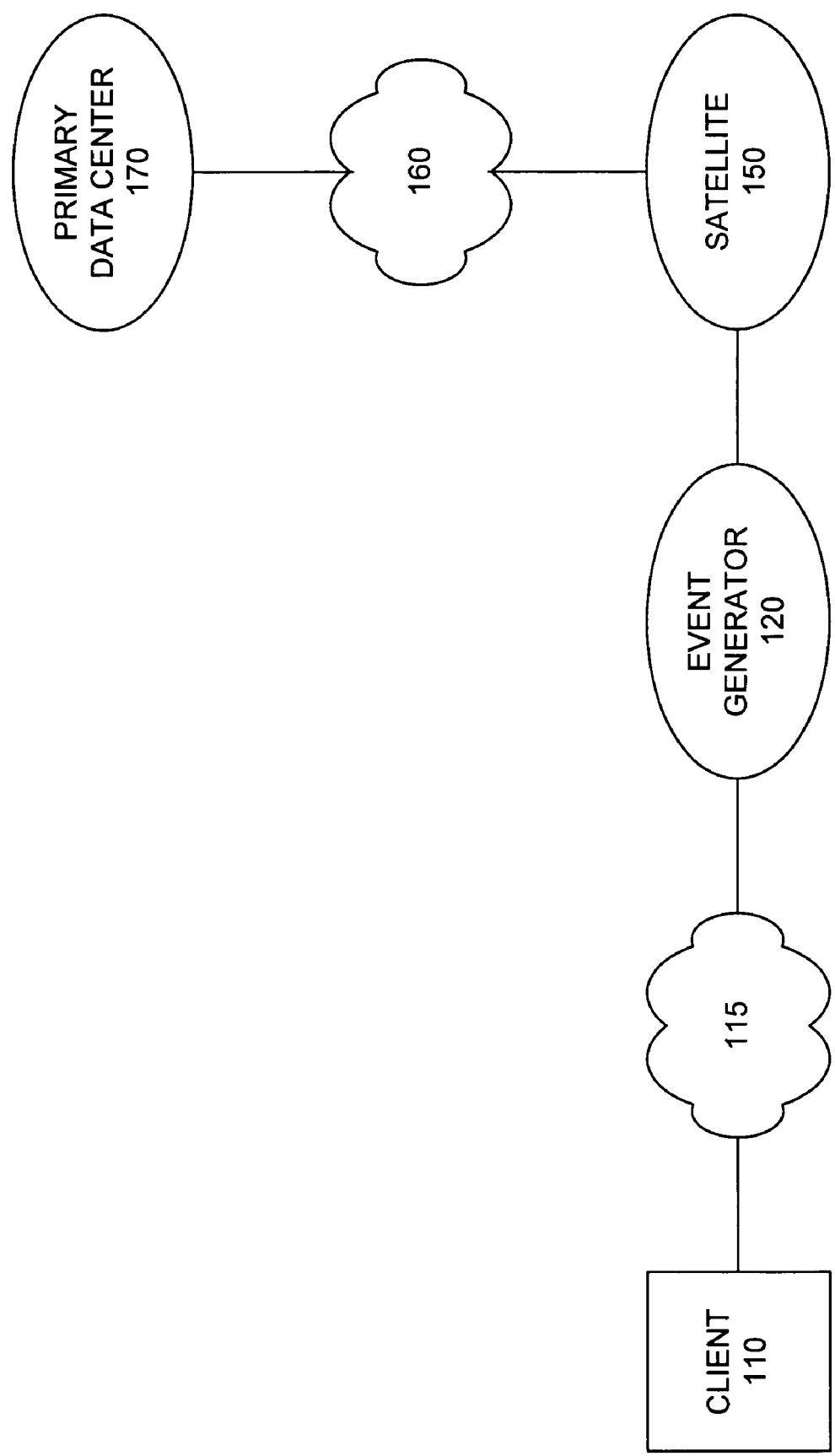
FIG. 4 illustrates a schematic diagram of a continuous event accounting system.

FIG. 4 illustrates a schematic diagram of a continuous event accounting system on which embodiments of the invention can be implemented. The system includes a client application 110, which can be used by a user to access the system. The machine on which the client 110 is executing is coupled to an event generator/network protocol server 120 through a communication link 115, shown as a network in FIG. 4. The event generator/network protocol server 120 is coupled to a satellite 150, which is coupled to a primary data center 170 through a communication link 160. The primary data center 170 includes a database that contains up-to-date account information. Such a system is further described in pending application titled "Distributed Nonstop Architecture for an Event Processing System", incorporated by reference above.

Figure 5A:
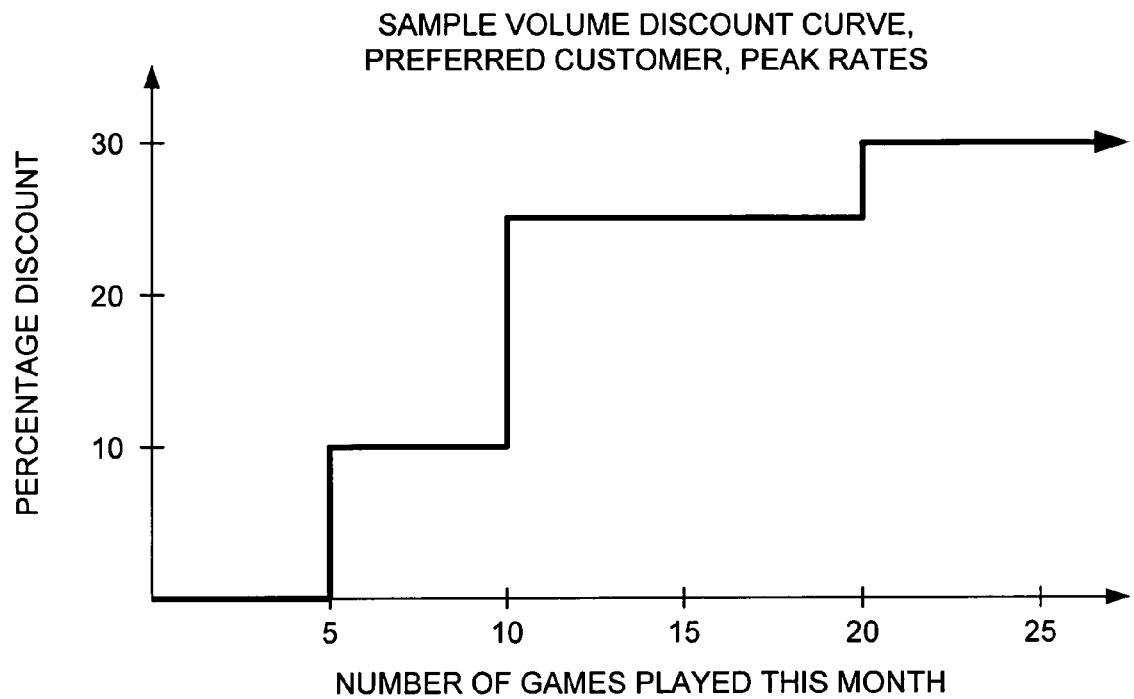
FIG. 5A illustrates a sample volume discount curve.
Figure 5B:
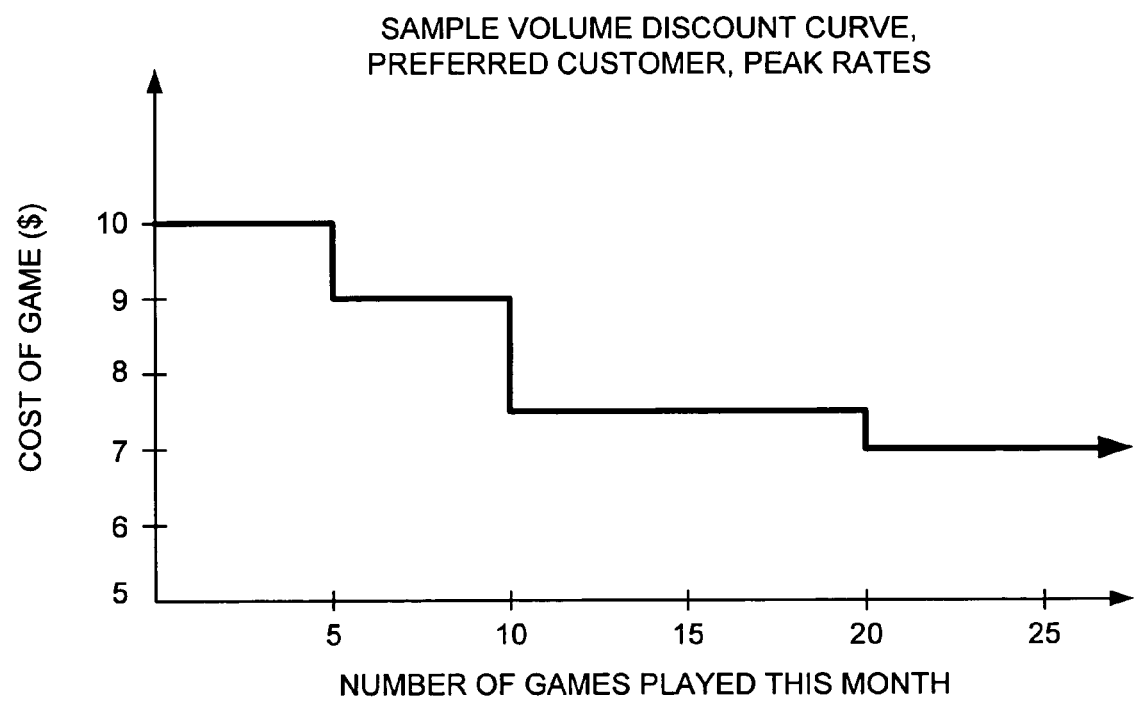
FIG. 5B illustrates a sample volume discount curve.

A simple flat-tiered volume discount scheme can be represented in graphical form. FIG. 5A shows a rating curve for a preferred customer during peak hours shown as a percentage discount depending on number of games played in a month. FIG. 5B shows the same rating curve displayed as cost of a game where the undiscounted cost is $10. A rating curve can be displayed in table form, with tier numbers, tier step points, and rates for each tier, for example as shown in FIG. 6, which shows the rating curves of FIGS. 5A-B. The amount of the discount can be represented as a positive number. Instead of a discount, a penalty can be imposed based on increasing usage for scarce resources such as water or electricity. Volume discount rating schemes need not be flat-tiered, however, and the tiers can be some function of the usage quantity, such as a linear function or natural log function.

More than one rating curve can apply to an account for a certain kind of purchase. For example, there can be different phone calling plans, each plan having different rates by distance zone and hour of the day.

"Usage" as used below in this application refers to accumulated usage associated with an account. For example, it can be total minutes called from a phone number during a month, number of phone calls made in a quarter, or total purchases from a vendor made during a year. The "event quantity" is the amount of a transaction, measured in (or translated into) the units used by the rating scheme. For example, the event quantity of a single phone call can be 30 (minutes) or 1800 (seconds) if the rating scheme rates calls by the minute or second. The event quantity of a single phone call can be 1 (call), if the rating scheme depends on number of phone calls. The event quantity can be measured in various ways including dollar amount purchased, minutes of connectivity, or units purchased (e.g., how many books bought).

A rating event is an event that is rated by the system. Usually a rating event arises when the account holder has made a purchase or used a service that should change his account balance and the event must be entered into the accounting system. For an on-line purchase of goods, a rating event can be triggered when the order is placed. For phone service that is rated by minutes of usage, a rating event can occur upon completion of the call. For a gaming service, where the volume discount scheme is based on number of games, a rating event can occur either upon starting a game or upon ending a game. For a gaming service, where the volume discount scheme is based on minutes of play, a rating event preferably occurs on termination of the game, although a system can be configured so that a game triggers a rating event every half-hour, for example. That is rating, can occur on a divisible portion of an entire session.

Figure 7:
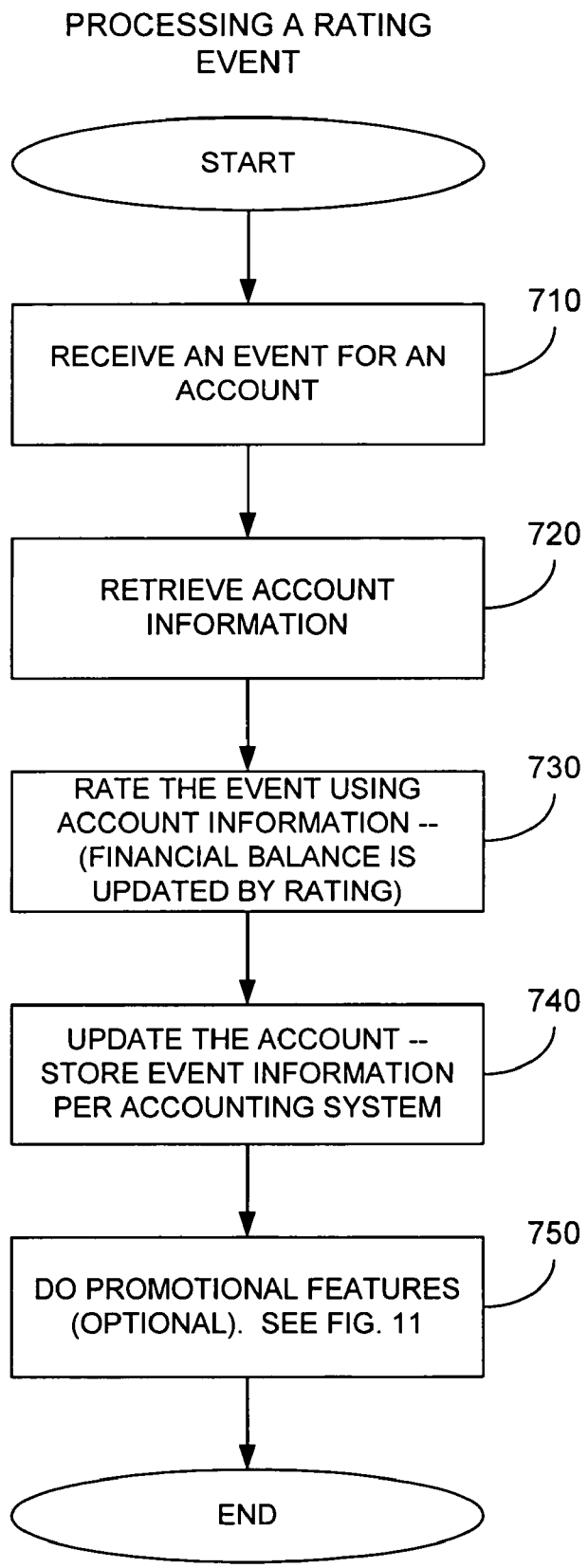
FIG. 7 illustrates a process flow diagram of processing a rating event.

FIG. 7 is a process flow diagram of processing a rating event. At a receive step 710, an event is received at a processing facility such as the primary data center 170 in the sample processing system shown in FIG. 4. The primary data center 170 includes a database that has current information. Rating can also be done at a satellite 150 if the satellite has access to information from the main database. The event is sent to the processing facility and processed at the time of the event, i.e. when the user has taken the action (e.g. mouse click) that results in an event being generated.

An event has an event quantity associated with it, for example 30 minutes of connectivity to the Internet. If there are multiple rating curves for this kind of event, the event can have other qualities that determine which rating curves to use. For example, it can have a time of day associated with it or a distance called. User qualities can also result in using different rating curves, depending on the implementation, e.g. preferred customer schemes. Information relating to the user and the event can also result in different rating curves, e.g. phone plans where calls to pre-designated friends and family members receive a special rate, where the plan has even lower rates for calls made on weekends.

The event is associated with an account, preferably by referring to a login name on the client where the event request originates, but also for instance, by referring to a serial number on an account card or the phone number of a phone order patron. At a retrieve step 720, account information including an accumulated usage is retrieved. The accumulated usage is an up-to-date value. In particular, at least the accumulated usage(s) relevant to the volume discount scheme for the event that is being processed is retrieved. If there are multiple possible curves, the applicable rating curve can be selected at this time.

At a rate step 730, rating of an event quantity is done referring to the accumulated usage and the applicable volume discount rating curve. Rating is described in more detail in FIGS. 8 and 9 subsequently.

At an update step 740, account information, including accumulated usage is updated to reflect the event according to the implementation of the accounting scheme. Any accumulated usage statistics that the accounting system is configured maintain, for example the number of phone calls made or total minutes called are updated. Other updating of the account can also be done in accordance with the configuration of the accounting system, e.g., the transaction can be stored.

Figure 11:
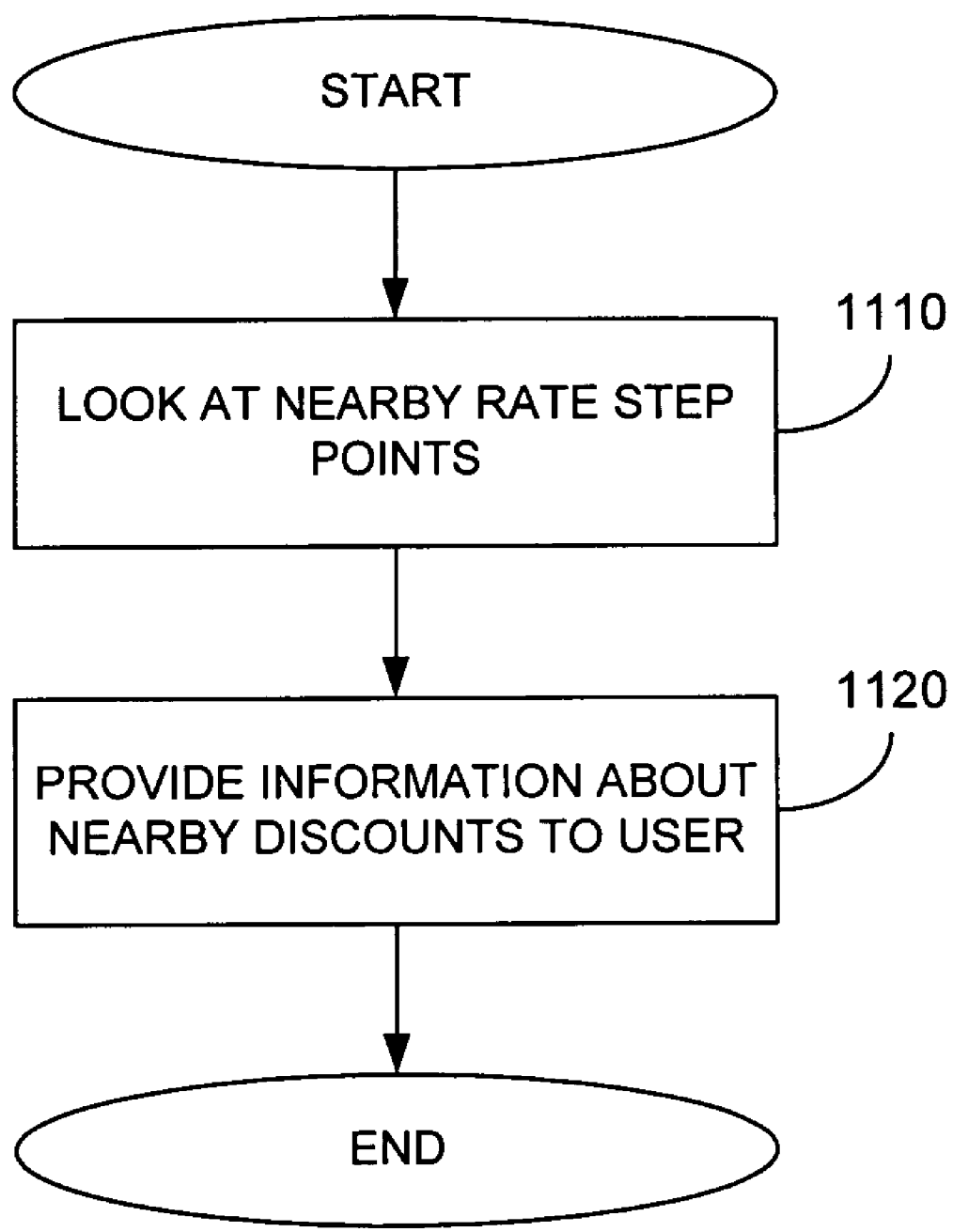
FIG. 11 is a process flow diagram of providing information about nearby volume discounts using a look-forward.

Promo step 750 can optionally be included where promotional features are done, as described in more detail in FIG. 11. While this application includes a complete description of preferred embodiments of the invention, various alternatives, modifications, and equivalents can be used. It should be evident that the invention is equally applicable by making appropriate modifications to the described embodiments. For example, the flowcharts are exemplary embodiments but steps may be added, deleted, combined, and reordered without departing from the spirit and scope of the invention. For example, promo step 750 can be deleted. Therefore, the description should not be taken as limiting the scope of the invention that is defined by the metes and bounds of the appended claims along with their full scope of equivalents.

Figure 8:
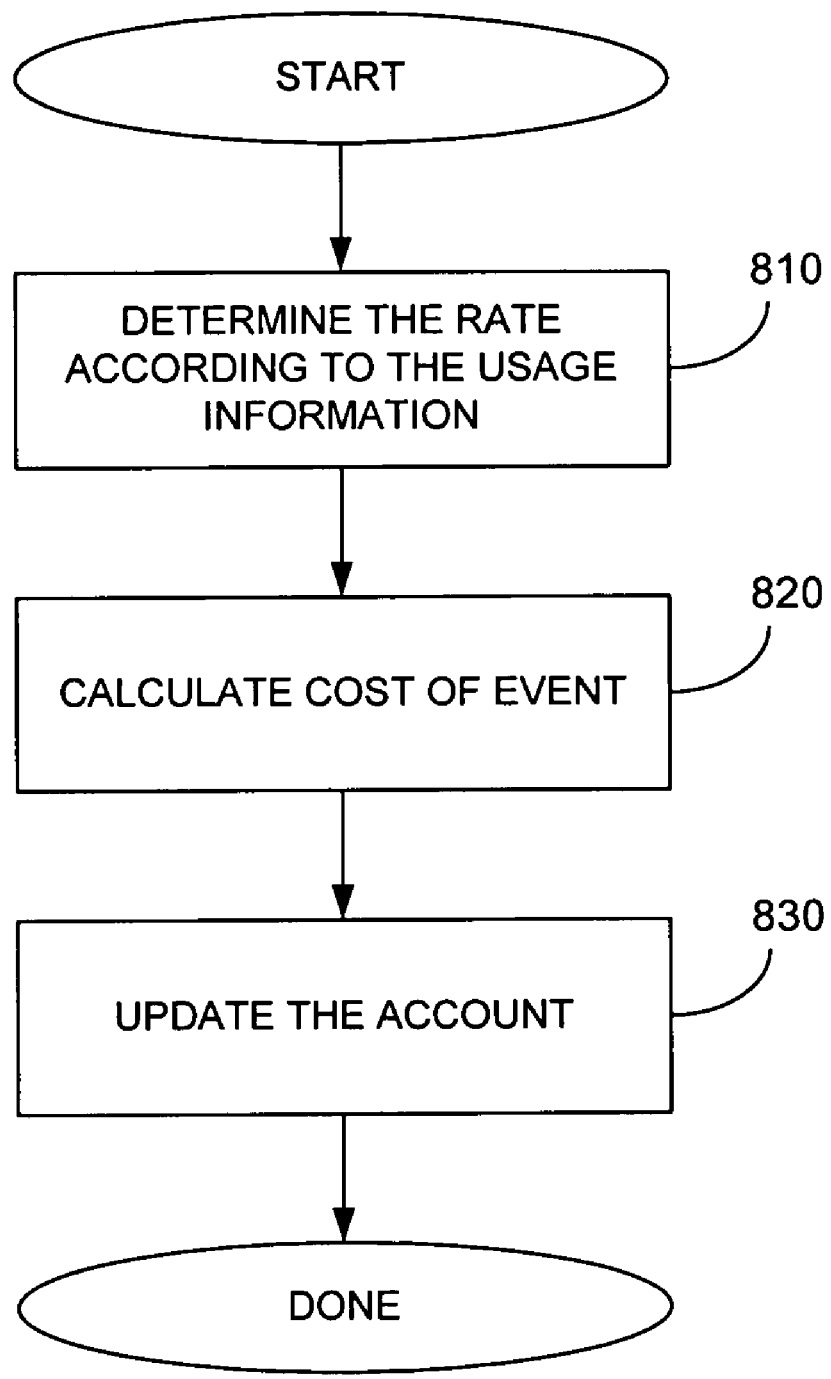
FIG. 8 is a process flow diagram of rating an event where exactly one rate applies.

FIG. 8 is a process flow diagram of rating an event where exactly one rate can apply to the event. An example of an event where only one rate can apply is where an event is defined to be a single transaction, e.g. one phone call, and the volume of the discount scheme is on number of transactions, e.g. by cumulative number of phone calls. However, the cost of an event where exactly one rate applies can be calculated by other methods, including, preferably, the method set forth in FIG. 9. The rating curve has been selected prior to rating.

At a determine rate step 810, the one rate that applies to the event is determined according to the accumulated usage information. At a calculate cost step 820, the cost of the event is calculated. This preferably is done by multiplying the one rate by the event quantity. However, it can be accomplished by any known mechanism, including using tables of costs for different rates and different quantities. At an update step 830, the account balance is updated, preferably by adding the cost of the event to the financial balance for the account.

Figure 9:
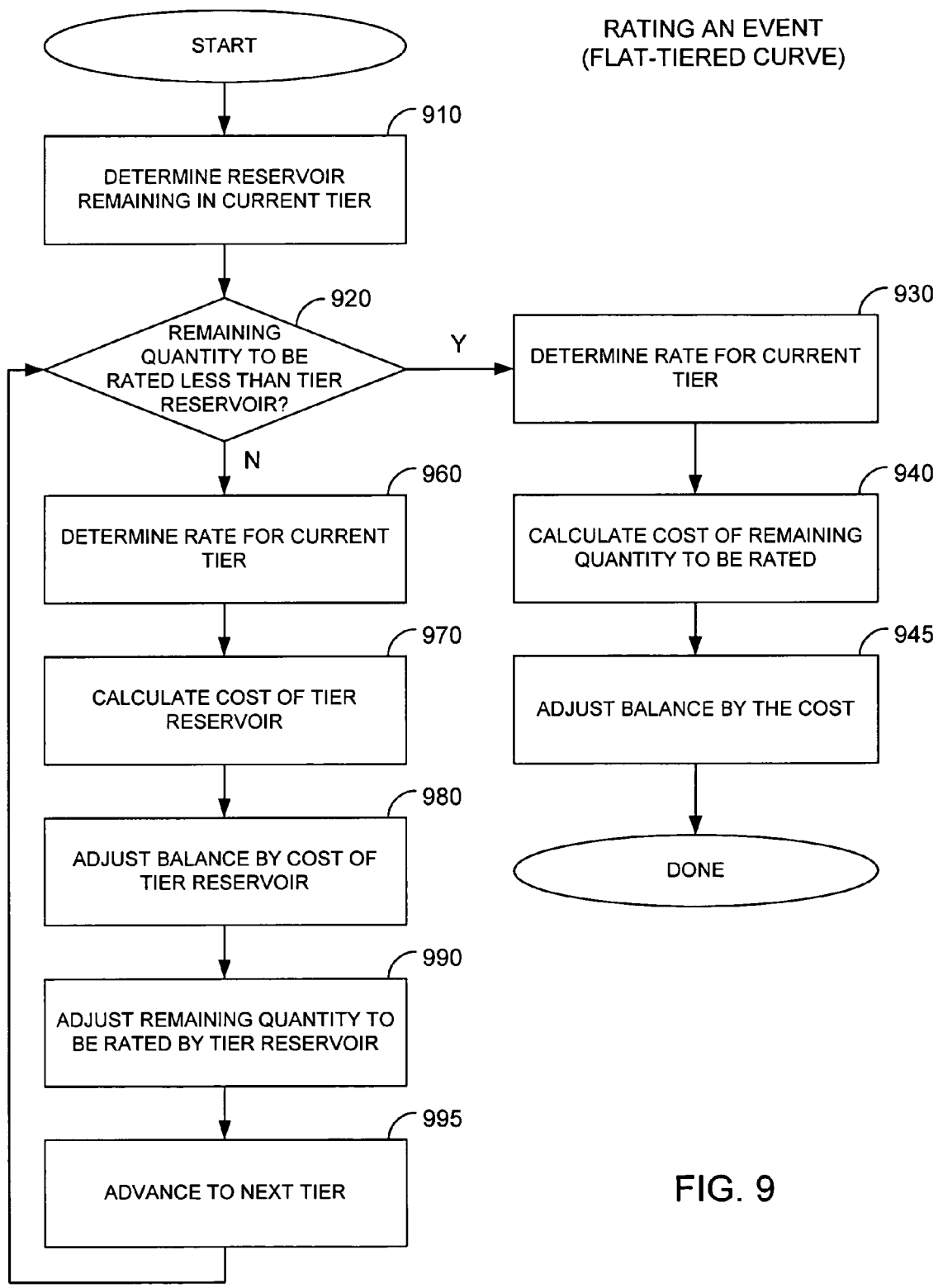
FIG. 9 is a process flow diagram of rating an event.

FIG. 9 shows a process flow diagram for rating an event where the rating curve is flat-tiered. It shows details of the rate step 730 of FIG. 7. The applicable rating curve has been selected prior to rating.

In the process shown in FIG. 9, the balance is adjusted for each portion of the event quantity that is rated. The balance can be adjusted in a temporary variable that is later written to the accounting system, or the balance in the accounting system database can be adjusted.

At an initialization step 910, the current tier and current tier reservoir (distance to the next step point) are determined. This can be done by referring to the accumulated usage and determining where such usage falls on the rating curve. For example, in the example given at the beginning of this application, where the curve has step-ups at 100 minutes and 200 minutes of usage in a month, if the account has accumulated usage of 85 minutes, we are in the first tier. In our example the accumulated usage is 85 and the step point is at 100, so the current tier reservoir is 15 minutes.

Also in the initialization step 910, the remaining quantity to be rated ("remaining quantity") is initialized to be the event quantity (the entire event quantity remains to be rated) for a simple flat-tiered scheme. During initialization, if the scheme is not a simple flat-tiered scheme but includes a base cost, e.g. $10 for the first 5 minutes or fraction thereof, and the remaining quantity to be rated is 5 minutes or less, the account balance is adjusted by the $10 and if the event quantity is 5 minutes or less, the remaining event quantity can be set to zero. If the event quantity is more than 5 minutes, the remaining event quantity can be set to the quantity that still needs to be rated per the rating scheme. Similarly, the balance can be adjusted by any base cost.

At a decision step 920, it is determined whether the remaining quantity is less than the tier reservoir. When the rating curve is in the same units as the event quantity, determination of whether the remaining quantity is less than the tier reservoir can be done by direct comparison. However, when the rating curve is in different units than the event quantity, determination of whether the remaining quantity is less than the tier reservoir can be accomplished by providing a way to compare the remaining quantity and the tier reservoir, for example by converting the tier reservoir into units of event quantity and comparing the result with the remaining quantity to be rated. For example, if a rating scheme provides a rate of 10 cents per minutes for the first 100 dollars of usage, and five cents per minutes thereafter, and the account balance is 90 dollars, then the tier reservoir is 10 dollars. A tier reservoir at a rate of 10 cents per minutes can provide 100 minutes of usage. This 100 minutes can be directly compared to the remaining quantity to be rate, say 35 minutes, to determine which is larger.

If the result of the decision step 920 is that the remaining quantity to be rated is less than the tier reservoir, then the remaining quantity can be rated in the current tier and the process proceeds along a "yes" path to a determine rate step 930, where the rate for the current tier is determined. This can be accomplished by reference to a table or by any known methods. At a calculate cost step 940, the cost of the remaining quantity is calculated. This can be done by multiplying the rate by the remaining quantity, by reference to tables or by any known methods. For example, if the remaining quantity is 15 minutes and the current tier rate is 10 cents/minute, the calculate cost step 940 will have a result of $1.50. At an adjust balance step 945, the account balance is adjusted by the portion cost calculated in the calculate cost step 940.

On the other hand, if at the decision step 920 it is determined that the remaining quantity to be rated is not less than the tier reservoir, then the remaining quantity ranges over more than one tier (or ranges to the end of the current tier), and the process proceeds along a "no" path to a determine rate step 960. In the determine rate step 960, the rate for the current tier is determined. This can be done, for example, by reference to the value of the current tier, and a lookup into a table such as shown in FIG. 6. The portion cost is determined at a calculate cost step 970, and is equal to the product of the rate for the current tier and the tier reservoir value for flat tiers. When the rating curves are more complicated curves than a flat line segment, the portion cost in steps 940, 970 and generally can be determined as known in the art of mathematics. For example, the portion cost can be determined by calculation by analytic integration, by integration through numerical methods, by reference to tables created by integrating analytically or numerically or by any other known methods.

The account balance is adjusted by the portion cost at an adjust balance step 980, for example by adding the portion cost to the balance. At an adjust quantity step 990, the remaining quantity is adjusted by the amount of the tier reservoir, which is the amount that was rated in the calculate cost step 970. Preferably, the tier reservoir is simply subtracted from the remaining quantity.

At an advance step 995, the current tier is advanced, preferably by incrementing, and the tier reservoir is reset to be the distance to the next step point. The process returns to the decision step 920 and continues until the "done" terminal is reached. Note that for the process flow diagram shown in FIG. 9 the rating curve should be the correct rating curve for the entire event—for example, if a phone call straddles day rates and night rates, it can be desirable to apply the rating scheme from the time that the call started to the entire call (i.e. either a day rating scheme or else a night rating scheme). If however, it is desired to apply day rates only to the portion of the call occurring in the day hours and night rates only to the portion of the call in the night hours, then in a preferred embodiment, a customized rating curve is created by pasting together the applicable portions of the day rating curve and the night rating curve prior to the steps shown in FIG. 9. Alternatively, the tier reservoirs can be set with a separate step at a time when the transaction changes rating curves, and a different rating curve used form the point forward.

A cost of event can be calculated by subtracting the financial balance prior to rating an event from the financial balance after rating the event, or by maintaining a temporary cost variable while rating the event. If using a temporary cost variable, the cost can be calculated by initializing the cost in the initialization step 910, and adjusting the cost by the cost of the portion in the adjust balance step 980 and adjust balance step 945.

Figure 10:
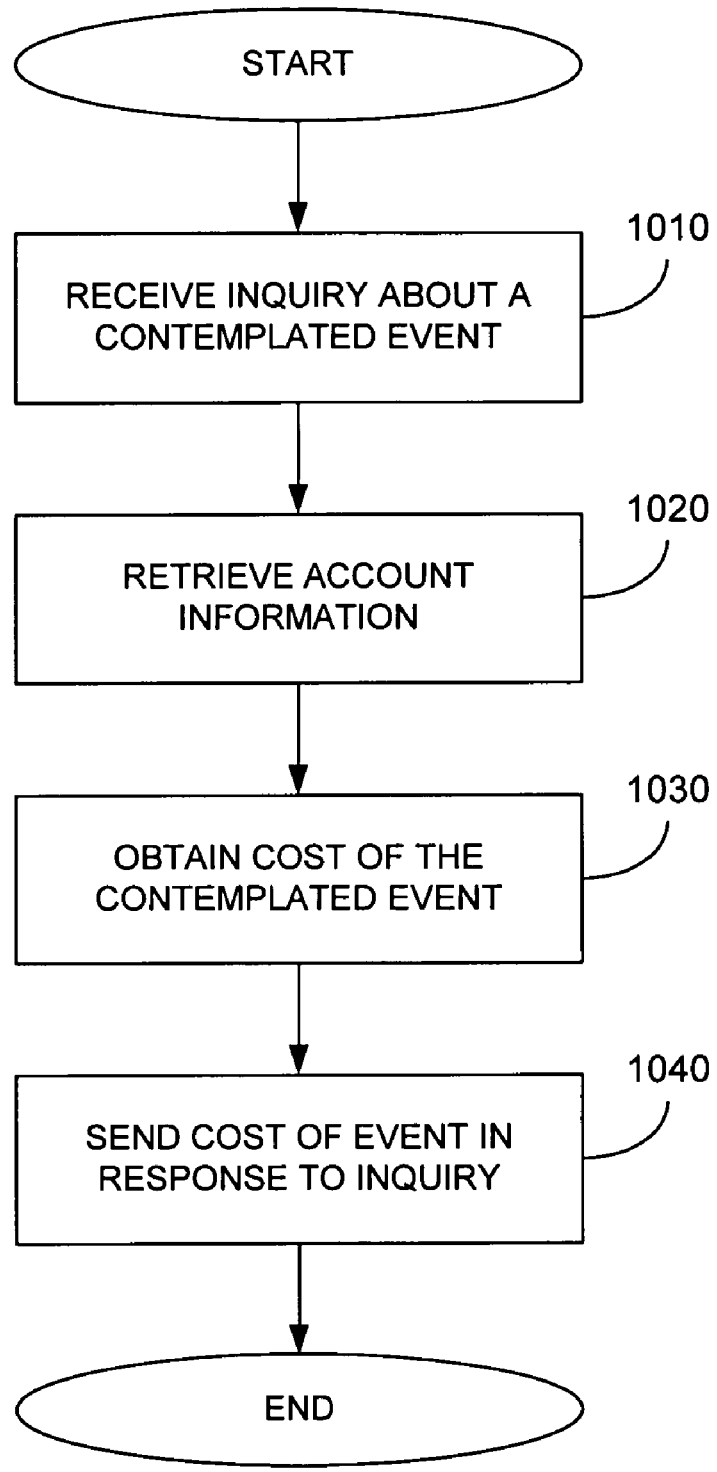
FIG. 10 is a process flow diagram of handling an inquiry event.

FIG. 10 is a process flow diagram for handling an inquiry event. It follow the same central steps as processing a rating event, but account balances are not updated, and preferably the promo step 750 is not performed.

At a receive inquiry step 1010, an inquiry is received. Typically, the inquiry will originate from a user using a client to access the system. The inquiry can be an inquiry about a rating event that the user is considering actuating. The inquiry can be, for instance, the user's current volume discounted cost to buy a certain dress priced at $89, or the user's current volume discounted rate on a phone call to England, or the current total cost including volume discount to phone England for 30 minutes.

Account information including current accumulated usage information is retrieved at a retrieve step 1020. At a obtain cost of event step 1030, the cost of the event is obtained. The cost of the event can be determined as in the description of FIG. 9, with cost calculated as described above.

Note, however, that balance need not be calculated as shown in FIG. 9 (although it can be), but if balance is calculated, it must be done with a variable—the account balance stored in the accounting system is not increased by the cost calculated. If there is a nominal charge for the inquiry event or it is desired to aggregate or store inquiry information, updating of the accounting system database can be performed, for example, at the time of step 1030. Preferably inquiries are free to the user and no updating of the information stored in the accounting system is performed.

At a send cost step 1040, a response to the inquiry is sent. The response can be a dollar cost. For example, where the user has achieved a volume discount of 20% the cost of the dress priced at $89 would be $71.20. The discounted cost can be sent to the user, or a cost including shipping and handling can be sent, or any cost of interest to the user. The response can be rate information. For example, the user's can be informed his current discounted rate for calling England now is 50 cents per minutes for the next 12 minutes of usage, and thereafter will be a further discounted rate of 35 cents per minutes for the next 100 minutes. Where there are multiple rating curves, e.g. night rates, and the inquiry is made near the time when rates change, the response can include the different rates, e.g. for an inquiry made at 4:58, the user can be told his discounted rate is 30 cents per minute for the first 2 minutes, and 20 cents per minute thereafter (alternatively, he can be told his discounted rate is 30 cents per minute until 5 PM, and 20 cents per minute after 5 PM). The response can be a cost where the inquiry is cost of a 30 minutes phone call made to England now, e.g. $12.75. The current actual cost or current actual rate is provided to the user, taking into account his current accumulated usage and volume discount.

FIG. 11 is a process flow diagram showing details of the promo step 750, optionally done after processing a rating event. At a look-forward step 1110, nearby discounts are identified. The discounts preferably are identified for the type of event that has just been rated, but can include discounts for other types of events. This can be done, for instance, by referring to the distance to the next step in the rating curve. If the next step point is within a pre-determined distance, e.g. $25 or 10 minutes, a message can be provided to the user at a step 1120. Similarly, if a step point has been crossed during the event that was just rated, a message can be provided. Messages can be provided by posting them on a web page that is accessible to the user, by a message sent to the source of the event, by an email message to the account holder or by any other known method.

Figure 12:
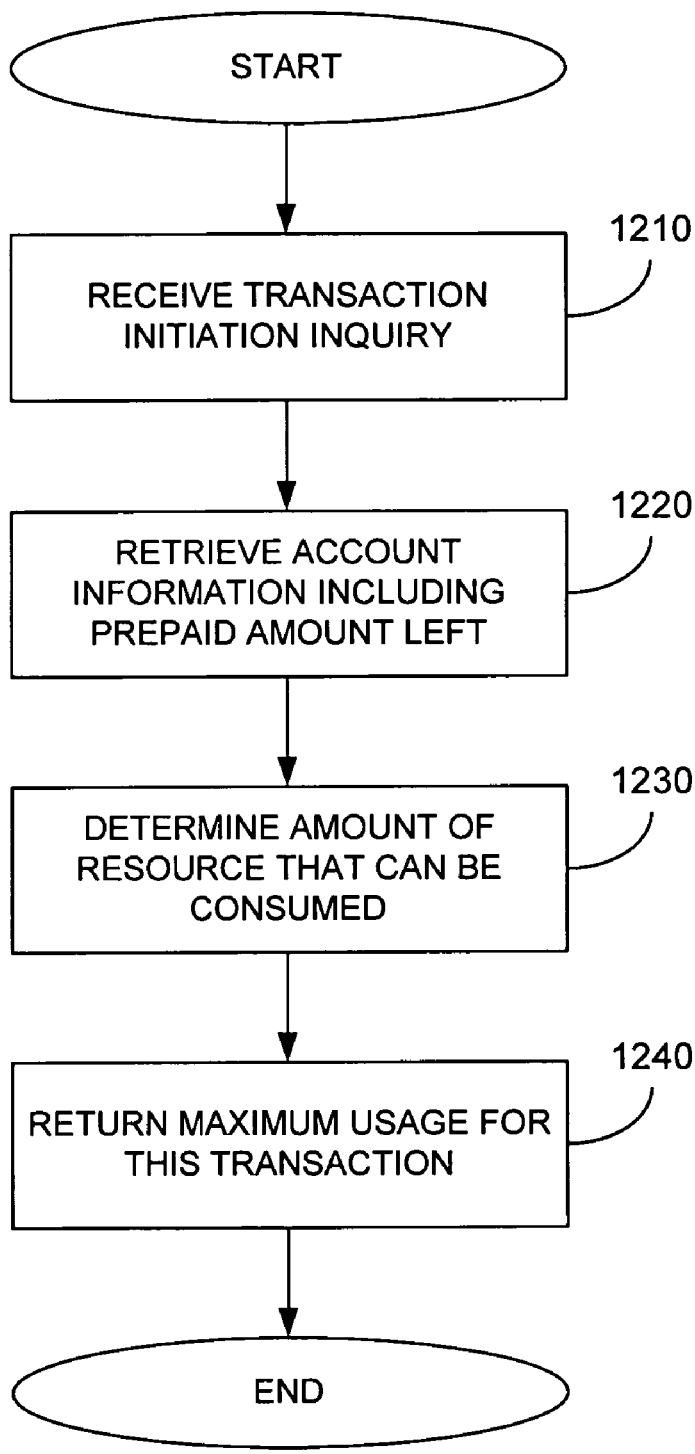
FIG. 12 is a process flow diagram of handling an inquiry event in a prepaid scheme.

FIG. 12 shows a process flow diagram of an inquiry event that can be used in the context of a prepaid account, which for example can be a prepaid phone card. (It is known to magnetically include a serial number on a prepaid phone card, which provides ease of use and tracking). The prepaid account can be in terms of dollars or other units. At a step 1210, a transaction initiation inquiry is received. Account information, including the prepaid amount left, is retrieved at a step 1220. Based on the prepaid amount remaining, at a step 1230 the amount of the resource represented by the amount remaining is determined referring to the applicable volume discount. For example, if a prepaid phone card has 1 dollar left, and the applicable volume discount rate at the time of inquiry is a night rate of 1 cent/minute, then 100 minutes of usage can be consumed with the 1 dollar remaining, although the user of course can choose to talk for less than the 100 minutes. This maximum quantity is returned as a result of the inquiry at a step 1240. The transaction system can be configured to authorize usage only up to this quantity.

While the above is a complete description of preferred embodiments of the invention, various alternatives, modifications, and equivalents can be used. It should be evident that the invention is equally applicable by making appropriate modifications to the embodiments described above. Therefore, the above description should not be taken as limiting the scope of the invention that is defined by the metes and bounds of the appended claims along with their full scope of equivalents.

With embodiments of the invention, a customer will be able to login to a web page at any time in the billing cycle and look up his actual costs by transaction or by summary. An on-line seller can, at the time of a contemplated event, provide the customer with the exact cost including any applicable volume discount.

What is claimed is:

1. A computer implemented method for rating a billing event in a real time accounting system, comprising:
   receiving at a processor a billing event for an account, wherein the billing event is triggered by a user action, and wherein the billing event is received at the processor at the time of the user action;
   retrieving current usage information for the account; and
   rating the billing event using the processor upon receiving the billing event according to the billing event, the current usage information, and a usage dependent rating scheme;
   wherein said usage dependent rating scheme comprises one or more rate step points and two or more tiers, said billing event having an associated event quantity, wherein the event quantity is an amount of the event;
   wherein rating comprises
   determining a current tier responsive to the current accumulated usage information;
   determining a current tier reservoir, wherein the current tier reservoir is a distance to a next step point on a rating curve;
   comparing the event quantity to the current tier reservoir; and
   if the event quantity is less than the tier reservoir, adjusting an account balance responsive to the current tier and the event quantity.

2. A computer implemented method for rating a billing event in a real time accounting system, comprising
   receiving a billing event for an account;
   retrieving current usage information for the account; and
   a processor rating the billing event upon receiving the billing event according to the billing event, the current usage information, and a usage dependent rating scheme;
   wherein said usage dependent rating scheme comprises one or more rate step points and two or more tiers, said billing event having an associated event quantity;
   wherein rating comprises
   initializing a remaining event quantity;
   determining a current tier;
   determining a current tier reservoir;
   if the event quantity is not less than the tier reservoir performing:
   calculating a portion cost for a portion of the event quantity equal to the current tier reservoir;
   adjusting an account balance by the portion cost;
   adjusting the remaining event quantity by the current tier reservoir; incrementing the current tier;
   setting the current tier reservoir to be a distance to a next step point from the incremented current tier;
   repeating said steps of calculating, adjusting the account balance, adjusting the remaining event quantity, incrementing and setting until the event quantity is less than the tier reservoir, then performing:
   calculating a final portion cost of the remaining event quantity responsive to the current tier;
   adjusting the account balance by the final portion cost.

3. A method as in claim 1, wherein rating comprises determining one or more rates applying to the billing event; and
   updating the account.

4. A method as in claim 3, comprising calculating a cost of the billing event.

5. A method as in claim 1, further comprising updating the account with the billing event.

6. A method as in claim 1, further comprising calculating a cost of the billing event to a source of the billing event.

7. A method as in claim 6, wherein calculating the cost, is performed during the rating.

8. A method as in claim 6, wherein calculating the cost is performed after the rating is performed.

9. A method as in claim 6, wherein providing comprises including the cost on a web page.

10. A method as in claim 6, wherein providing comprises sending a communication to a user associated with the account.

11. A method as in claim 10, wherein the communication is an email message.

12. A method as in claim 1, wherein exactly one rate applies to the billing event.

13. A method as in claim 12, wherein rating the billing event comprises:
   determining the exactly one rate responsive to the current accumulated usage information;
   calculating a cost of the billing event.

14. A method as in claim 1, wherein each said two or more tiers has an associated discount function.

15. A method as in claim 14, wherein each said associated discount function has a constant value.

16. A method as in claim 15, wherein each said constant value represents a discount rate.

17. A method as in claim 1, wherein said one or more rate step points are responsive to a number of events during a period.

18. A method as in claim 17, wherein the number of events is a number of phone calls made, a number of game sessions, or a number of items purchased.

19. A method as in claim 17, wherein said number of events is a number of content items viewed.

20. A method as in claim 19, wherein said content items are news articles or stock quotes.

21. A method as in claim 1, wherein said rate step points are responsive to an amount of usage of a resource associated with the event.

22. A method as in claim 21, wherein said amount of usage is a duration.

23. A method as in claim 22, wherein said duration is minutes of a phone call, minutes of connectivity to Internet access, or minutes of connectivity to a gaming service.

24. A method as in claim 21, wherein said amount of usage is a number of pages of text viewed or a number of items purchased.

25. A method as in claim 1, wherein said one or more rate step points are responsive to an amount spent.

26. A method as in claim 1, wherein a cost of the event is determined responsive to a sum of the current accumulated usage information and the event quantity.

27. A method as in claim 26, wherein a table is used in determining said cost.

28. A method as in claim 1 wherein the billing event is an inquiry event.

29. A method as in claim 28, further comprising providing a cost to a source of the billing event.

30. A method as in claim 1 further comprising:
performing a look-forward into a rating scheme responsive to the account information comprising current accumulated usage information;
sending marketing information to a source of the billing event responsive to performing the look-forward.

31. A method as in claim 1, wherein said usage dependent rating scheme includes a plurality of rating curves, including selecting one or more of said plurality of rating curves responsive to information about the billing event.

32. A method as in claim 1, wherein said usage dependent rating scheme includes a plurality of rating curves, including selecting one or more of said plurality of rating curves responsive to the account information.

* * * * *